United States Patent [19]

Sengoku

[11] 4,389,068
[45] Jun. 21, 1983

[54] DEVICE FOR FIXING A WINDOW MOLDING ONTO A WINDOWPANE

[75] Inventor: Ikuo Sengoku, Toyota, Japan

[73] Assignee: Toyota Jidosha Kogyo Kabushiki Kaisha, Toyota, Japan

[21] Appl. No.: 250,736

[22] Filed: Apr. 3, 1981

[30] Foreign Application Priority Data

Nov. 5, 1980 [JP] Japan ................. 55/154571

[51] Int. Cl.³ ............................................. B60J 1/02
[52] U.S. Cl. ...................... 296/206; 296/84 R; 296/93; 52/718
[58] Field of Search ............ 296/84 R, 84 D, 93, 296/206; 52/208, 718, 716, 717, 397

[56] References Cited

U.S. PATENT DOCUMENTS

| | | | |
|---|---|---|---|
| 3,245,182 | 4/1966 | Zierold | 296/84 R |
| 4,168,858 | 9/1979 | Inamoto | 296/84 R |
| 4,262,960 | 4/1981 | Fifer | 296/84 R |
| 4,278,286 | 7/1981 | Kiba | 296/93 |

*Primary Examiner*—Robert R. Song
*Attorney, Agent, or Firm*—Parkhurst & Oliff

[57] ABSTRACT

A windowpane assembly comprising a molding clip inserted between the circumferential end face of the windowpane and the riser portion of the fillister formed on a vehicle body for fixing a window molding onto the windowpane. The molding clip comprises a holding portion fitted into the window molding, an elastic curved base portion, and a pair of L-shaped latch arms connected to the opposite ends of the base portion and extending so as to approach to each other. Before the molding clip is inserted between the windowpane and the riser portion of the fillister, the latch claws, formed on the tips of the latch arms, are engaged with the corresponding latch claws formed on the central portion of the base portion. When the molding clip is inserted between the windowpane and the riser portion of the fillister, the latch claws of the latch arms are automatically disengaged from the latch claws of the base portion and, thus, the central portion of the base portion comes into engagement with the rear face of the windowpane.

16 Claims, 11 Drawing Figures

DEVICE FOR FIXING A WINDOW MOLDING ONTO A WINDOWPANE

DESCRIPTION OF THE INVENTION

The present invention relates to a device for fixing a windowpane, such as a windshield or a rear window of a vehicle, onto the body of a vehicle.

As illustrated in FIG. 1, in, for example, a windshield of a motor vehicle, the periphery of the windshield 1 is covered by a decorative window molding 2, and a plurality of window molding fixing devices 3 is attached onto the rear of the window molding 2. FIG. 2 illustrates a cross-section of such a conventional window molding fixing device 3. Referring to FIG. 2, the body panel 4 of a vehicle has a fillister 5 formed thereon for receiving the windshield 1, and the periphery of the windshield 1 is stuck onto the bottom wall 6 of the fillister 5 by means of an adhesive packing material 7. On the other hand, a T-shaped stud 9, having an enlarged head, is welded onto the riser portion 8 of the fillister 5, and a molding clip 10, made of a synthetic resin, is fitted onto the stud 9. As illustrated in FIG. 3, the molding clip 10 has an elastic deformable portion 11 at the central portion thereof, and an increased diameter hole 12 and a reduced diameter hole 13, which are interconnected to each other, are formed on the elastic deformable portion 11. The molding clip 10 is secured onto the riser portion 8 of the fillister 5 as illustrated in FIG. 2 in such a way that, firstly, the increased diameter hole 12 of the molding clip 10 is inserted into the stud 9 and, then, the reduced diameter hole 13 of the molding clip 10 is fitted onto the stud 9. After this, the outer peripheral portion 14 of the molding clip 10 is fitted into the underside of the claw 15 by striking the window molding 2 with a hammer and, thus, the window molding 2 is fixed onto the windshield 1.

However, in such a conventional window molding fixing device 3, since it is necessary to weld a plurality of the studs 9 onto the riser portion 8 of the fillister 5, it takes a long time for the welding operation and, as a result, a problem occurs in that the manufacturing time period and cost will be increased. In addition, the window molding 2 is secured into the molding clip 10 in such a way that the outer peripheral portion 14 of the molding clip 10 is fitted into the underside of the claw 15 by striking the window molding 2 with a hammer, as mentioned above. Consequently, at this time, there is a possibility the painted surface of the body panel 4 will be damaged by the window molding.

An object of the present invention is to provide a window molding fixing device which is capable of easily and assuredly fixing the window molding onto a windowpane without using the T-shaped stud and is free from the occurrence of damage to the painted surface of the body panel.

According to the present invention, there is provided a windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section, said device having a molding clip inserted into the gap for fixing the window molding onto the windowpane, said molding clip comprising: a holding portion engageable with the C-shaped cross-section of said window molding; an elastic curved base portion extending along the riser portion of the fillister and intended to resiliently abut against the outer periphery of the windowpane within the gap; a pair of latch arms comprising root portions which extend from longitudinal opposite ends of said base portion towards the outer periphery of the windowpane and having tips, and arm portions which are spaced from said base portion and extend from the tips of said corresponding root portions so as to approach each other, said latch arms being engageable with a central portion of said base portion for maintaining said base portion in a compressed state to accumulate the elastic force of said base portion, and; disengaging means for disengaging said latch arms from the central portion of said base portion and causing said base portion to resiliently abut against the outer periphery of the windowpane.

The present invention may be more fully understood from the description of a preferred embodiment of the invention set forth below, together with the accompanying drawings.

DESCRIPTION OF A PREFERRED EMBODIMENT

Figure 1:
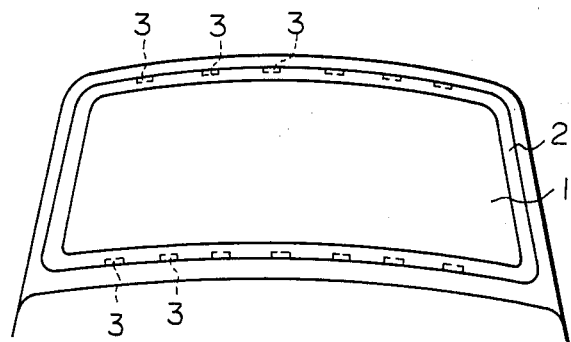
FIG. 1 is a front view of a windshield of a vehicle.
Figure 2:
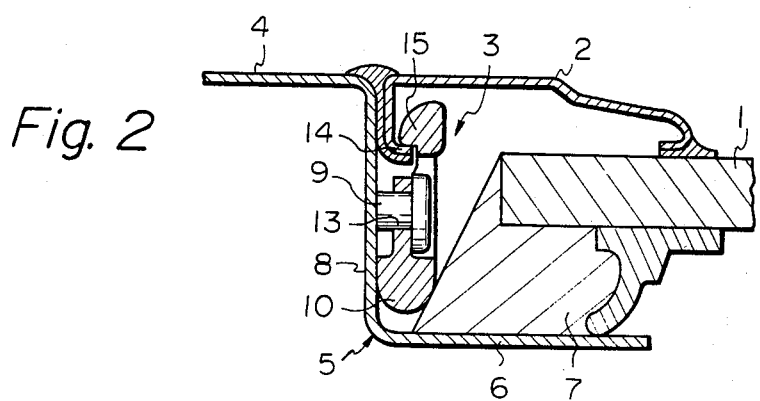
FIG. 2 is a cross-sectional side view of a conventional window molding fixing device.
Figure 3:
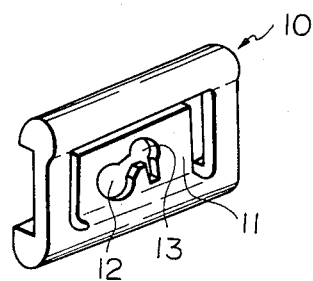
FIG. 3 is a perspective view of the clip illustrated in FIG. 2.
Figure 4:
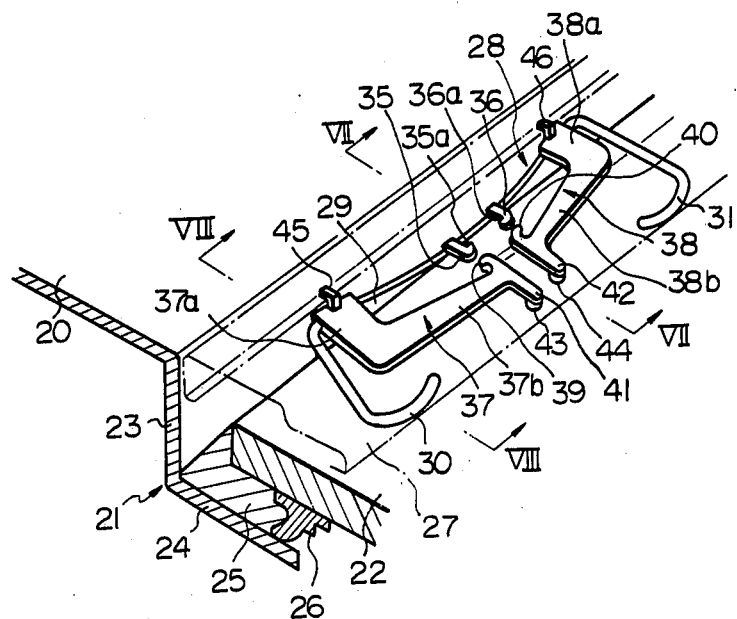
FIG. 4 is a perspective view of a window molding fixing device according to the present invention.

Referring to FIG. 4, 20 designates a body panel exposed to the exterior of a vehicle, and 21 a fillister having an L-shaped cross-section for receiving a windowpane 22 therein. The fillister 21 comprises a riser portion 23 extending inwardly from the edge of the body panel 20 and substantially perpendicular to the body panel 20, and a bottom wall portion 24 extending from the inner end of the riser portion 23 parallel to the body panel 20. The windowpane 22 is stuck onto the bottom wall portion 24 by means of an adhesive packing material 25 which has a resiliency when it is hardened. In addition, a dam member 26 is mounted on the rear face of the windowpane 22 for preventing the outflow of the adhesive packing material 25 when the windowpane 22 is stuck onto the bottom wall portion 24 by using the adhesive packing material 25. FIG. 4 illustrates the interior of a window molding 27 having a generally C-shaped cross-section and the window molding 27 is depicted by a line of short and long dashes.

Figure 5:
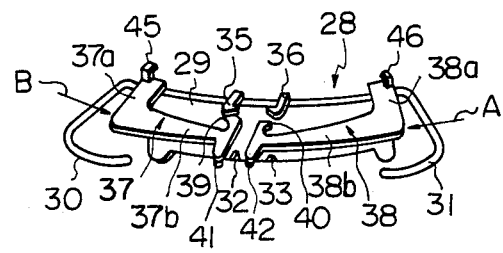
FIG. 5 is a perspective view of the molding clip illustrated in FIG. 4.
Figure 6:
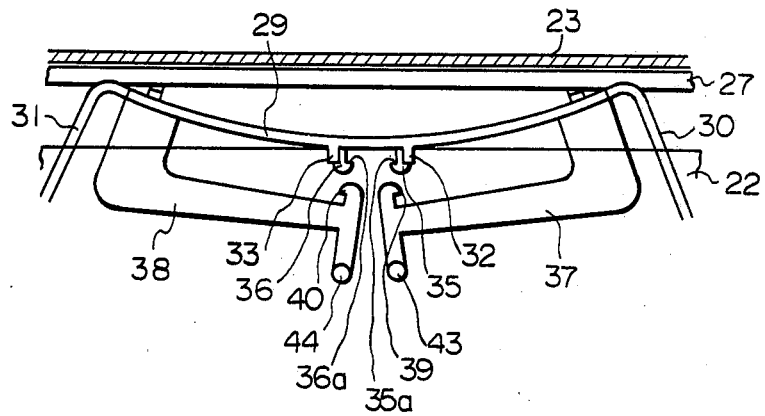
FIG. 6 is a bottom view of FIG. 4.
Figure 7:
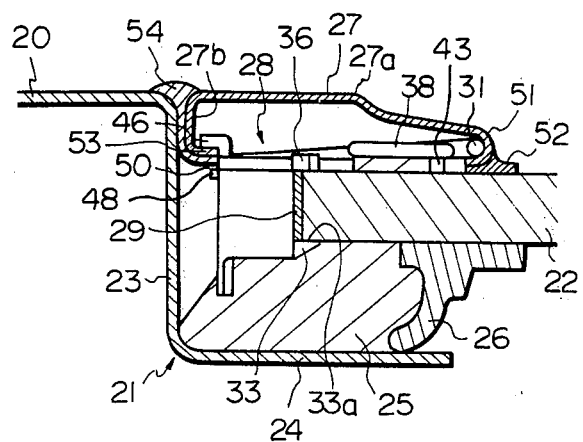
FIG. 7 is a cross-sectional side view taken along the line VII—VII in FIG. 4.
Figure 8:
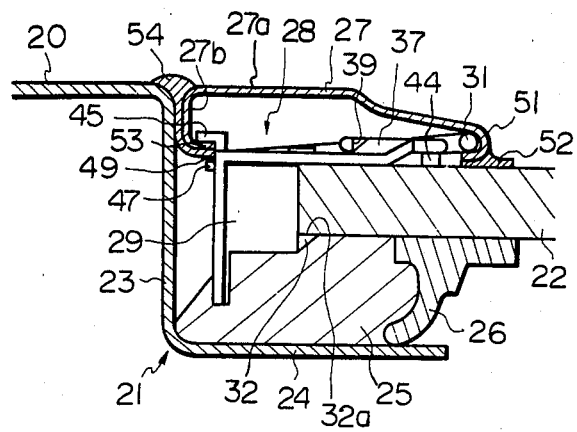
FIG. 8 is a cross-sectional side view taken along the line VIII—VIII in FIG. 4.

FIGS. 4, 6, 7 and 8 illustrate the state wherein the window molding 27 is fixed onto the windowpane 22 by means of a molding clip 28 according to the present invention, and FIG. 5 illustrates only the molding clip 28 of FIG. 4. Referring to FIGS. 4 through 8, the molding clip 28 comprises an elastic curved base portion 29 inserted between the circumferential end face of the windowpane 22 and the riser portion 23 of the fillister 21. The base portion 29 has a rectangular shape and extends along the circumferential end face of the windowpane 22. From FIG. 5 illustrating the molding clip 28 which is in a free state, it will be understood that the base portion 29 is curved in such a free state. Holding members 30, 31, extending substantially perpendicular to the front face of the base portion 29, are fixed onto the opposite ends of the base portion 29, and each of the holding members 30, 31 has an inwardly bent tip and, hence, has a L-shape. A pair of spaced claws 32, 33, which are engageable with the periphery of the rear face of the windowpane 22, is formed on the lower end of the central portion of the front face of the base portion 29. As illustrated in FIGS. 7 and 8, the claws 32 and 33 have flat engaging faces 32a and 33a extending perpendicular to and outwardly from the front face of the base portion 29, respectively. In addition, a pair of spaced latch claws 35, 36 are formed in one piece on the top of the central portion of the base portion 29. The latch claws 35 and 36 have step portions 35a and 36a extending substantial parallel to the central portion of the front face of the base portion 29, respectively. In addition, each of the latch claws 35, 36 has a flat lower face engageable with the periphery of the front face of the windowpane 22 and extending perpendicular to the front face of the base portion 29.

L-shaped latch arms 37, 38 are formed in one piece on the opposite ends of the top of the base portion 29. The latch arms 37 and 38 comprise root portions 37a and 38a extending perpendicular to the front face of the base portion 29, and arm portions 37b and 38b extending inwardly from the tips of the root portions 37a and 38b parallel to the base portion 29, respectively. Latch claws 39 and 40, which project towards the base portion 29 and are engageable with the latch claws 35 and 36, are formed on the tips of the arm portions 37b and 38b, respectively. The latch claws 35, 36 and the latch claws 39, 40 are located in the same plane in a free state as illustrated in FIG. 5. In addition, disengaging arms 41 and 42, projecting in a direction which is opposite to the projecting direction of the latch claws 39 and 40, are formed in one piece on the tips of the arm portions 37b and 38b, respectively, and projections 43 and 44 are formed on the lower walls of the disengaging arms 41 and 42, respectively. On the other hand, projections 45 and 46, projecting outwardly from the rear face of the base portion 29, are formed on the ends of the root portions 37a and 38a, respectively. In addition, as illustrated in FIGS. 7 and 8, other projections 47 and 48, slightly spaced from the projections 45 and 46, are formed on the rear face of the base portion 29 beneath the projections 45 and 46, respectively consequently, grooves 49 and 50, having a U-shaped cross-section, are formed between the projections 45 and 47 and between the projections 46 and 48.

As illustrated in FIGS. 7 and 8, the window molding 27 comprises a front portion 27a extending substantially parallel to the windowpane 22 and exposed to the exterior of the vehicle, and a bending portion 27b extending downwardly from the outer circumferential edge of the front portion 27a and substantially perpendicular to the front portion 27a. The inner circumferential edge 51 of the front portion 27a of the window molding 27 is bent inward in the form of a C-shaped cross-section, and a rubber member 52 for protection is stuck onto the outer wall of the inner circumferential edge 51 of the front portion 27a. On the other hand, the lower edge portion 53 of the bending portion 27b of the window molding 27 is bent in the form of an L-shape cross-section, and a rubber member 54 for protection is stuck onto the outer wall of the bending portion 27b.

Figure 9:
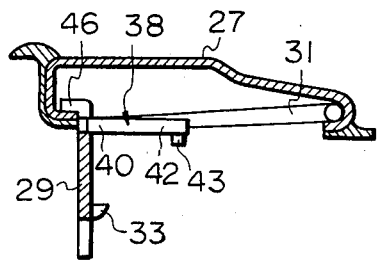
FIG. 9 is a perspective view of a molding clip fixed onto a window molding.
Figure 10:
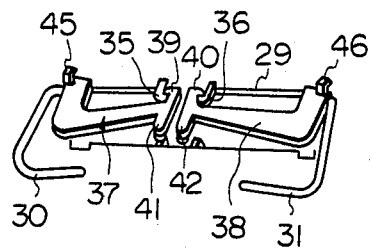
FIG. 10 is a perspective view of the molding clip illustrated in FIG. 9.
Figure 11:
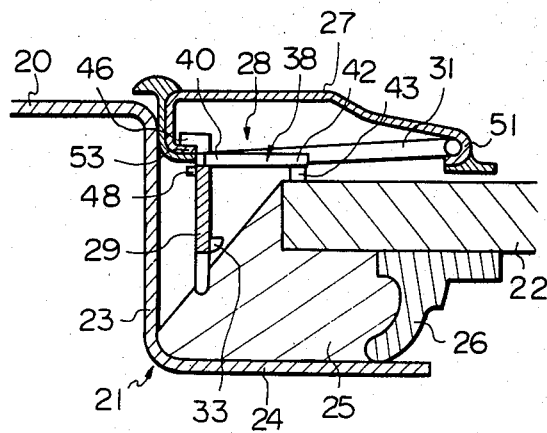
FIG. 11 is a cross-sectional side view illustrating the same cross-section as that of FIG. 8 and illustrating the initial stage of the insertion of the molding clip.

The windowpane 22 is stuck onto the bottom wall portion 24 of the fillister 21 by means of the adhesive packing material 25 as mentioned above and, then, the window molding 27 is fixed onto the windowpane 22 by means of the molding clip 28 before the adhesive packing material 25 is hardened. The base portion 29 of the molding clip 28 is curved in the form of an arm in a free state as illustrated in FIG. 5. The bent tips of the holding members 30, 31 of the molding clip 28 are fitted into the C-shaped cross-section of the inner circumferential edge 51 of the window molding 27 in such a free state. Then, the projections 45, 46 of the molding clip 28 are inserted into the C-shaped cross-section of the window molding 27 while elastically deforming the holding members 30, 31, and the lower edge portion 53 of the window molding 27 are fitted into the grooves 49, 50 formed on the rear face of base portion 29. After this, the latch arms 37, 38 are pushed so as to approach to each other against the elastic force of the base portion 29 as illustrated by the arrows A, B in FIG. 5 and, then, the latch claws 39, 40 of the latch arms 37, 38 are engaged with the step portions 35a, 35b of the corresponding latch claws 35, 36 of the base portion 29 by a snapping action as illustrated in FIGS. 9 and 10. At this time, as illustrated in FIGS. 9 and 10, the shape of the base portion 29 becomes straight. However, instead of engaging the latch claws 39, 40 with the latch claws 35, 36 after the holding members 30, 31 of the molding clip 28 are inserted into the window molding 27 as mentioned above, the holding members 30, 31 of the molding clip 28 may be inserted into the window molding 27 after the latch laws 39, 40 are engaged with the corresponding latch claws 35, 36. Then, the molding clip 28, supported by the window molding 27, is inserted between the circumferential end face of the windowpane 22 and the riser portion 23 of the fillister 21. At this time, firstly, the projections 43, 44 of the disengaging arms 41, 42 abut against the front face of the windowpane 22 as illustrated in FIG. 11. After this, when the molding clip 28 is further pushed together with the window molding 27, since the lower edge portion 53 of the window molding 27 comes into engagement with the projections 47, 48 and, thereby, the base portion 29 is pushed down, the latch claws 35, 36, formed on the base portion 29, are pushed down. However, at this time, since the projections 43, 44 of the disengaging arms 41, 42 abut against the windowpane 22, the disengaging arms 41, 42 cannot move downward and, thus, the latch claws 39, 40 of the latch arms 37, 38 also cannot move downwards. Consequently, when the molding clip 28 is further pushed down, the latch claws 39, 40 are disengaged from the corresponding latch claws 35, 36 and, thus, the base portion 29 is returned to a state as illustrated in FIG. 5 due to the elastic force of the base portion 29. As a result of this, as illustrated in FIGS. 4, 6, 7 and 8, the base portion 29 enters into the adhesive packing material 25 which has not been hardened, and the central portion of the base portion 29 resiliently abuts against the circumferential end face of the windowpane 22. At this time, the claws 32, 33 of the base portion 29 come into engagement with the periphery of the rear face of the windowpane 22. As a result of this, the window molding 27 is fixed onto the windowpane 22 by the claws 32, 33 of the base portion 29.

In the present invention, the molding clip 28 is made, in one piece, of a synthetic resin, such as polyamide and polyacetal. In addition, in order to obtain a further higher elasticity, metallic spring plates may be embedded in the base portion 29. Furthermore, the entirety of the molding clip 28 may be made, in one piece, of a metallic material.

According to the present invention, since it is not necessary to weld a T-shaped stud to the riser portion of the fillister, as in a prior art, it is possible to reduce the length of time which is necessary to assemble the window molding to the windowpane. In addition, after the molding clip is inserted between the circumferential end face of the windowpane and the riser portion of the fillister, the window molding can be fixed onto the windowpane by putting a slight force on the window molding, which force is necessary to disengage the latch claws of the latch arms from the latch claws of the base portion. Consequently, it is possible to prevent the painted surface of the body panel from being damaged when the window molding is fixed onto the windowpane. Furthermore, since the elastic force of the base portion has a slight influence on the force which is necessary to push the window molding into the fillister, it is possible to considerably strengthen the elastic force of the base portion and, thus, the force of holding the window molding can be increased as compared with that in a prior art. In addition, in the present invention, when the latch claws of the latch arms are engaged with the latch claws of the base portion, the transverse width of the molding clip becomes rather thin. Furthermore, when the latch claws of the latch arm are disengaged from the latch claws of the base portion of the molding clip, the claws of the base portion are able to come into engagement with the periphery of the rear face of the windowpane independently of the distance between the base portion and the circumferential end face of the windowpane. Consequently, even if a considerable irregularity in the distance between the circumferential end face of the windowpane and the riser portion of the fillister is present, it is possible to securely fix the window molding onto the windowpane. In addition, in the present invention, since the window molding is fixed onto the windowpane by using the elastic force of the base portion, it is possible to obtain a strong force to hold the window molding.

While the invention has been described by reference to a specific embodiment chosen for purposes of illustration, it should be apparent that numerous modifications could be made thereto by those skilled in the art without departing from the basic, concept and scope of the invention.

I claim:

1. A windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section, said device having a molding clip inserted into the gap for fixing the window molding onto the windowpane, said molding clip comprising:

a holding portion engageable with the C-shaped cross-section of said window molding;

an elastic curved base portion extending along the riser portion of the fillister and intended to resiliently abut against the outer periphery of the windowpane within the gap, said base portion having thereon grasping means to grasp the windowpane, said holding portion connected to said base portion;

a pair of latch arms comprising root portions which extend from longitudinal opposite ends of said base portion towards the outer periphery of the windowpane and have tips, and arm portions which are spaced from said base portion and extend from the tips of said corresponding root portions so as to approach each other, said latch arms being engageable with a central portion of said base portion for maintaining said base portion in a compressed state to accumulate the elastic force of said base portion, and thereby deform said base portion from its uncompressed configuration, and;

disengaging means for disengaging said latch arms from the central portion of said base portion and causing said base portion to attempt to return to its uncompressed configuration, to thereby resiliently abut against the outer periphery of the windowpane.

2. A windowpane assembly as claimed in claim 1, wherein the C-shaped cross-section of said window molding has opposed end portions, and the holding portion of said molding clip has a pair of engaging ends, each being in engagement with the corresponding one of the opposed end portions of said window molding.

3. A windowpane assembly as claimed in claim 2, wherein the holding portion of said molding clip has at least one elastic holding member which is in engagement with one of the opposed end portions of said window molding.

4. A windowpane assembly as claimed in claim 1, wherein said grasping means comprises at least one claw which is engageable with a peripheral rear face of said windowpane.

5. A windowpane assembly as claimed in claim 4, wherein said base portion has a central front face which is able to resiliently abut against a circumferential end face formed on the outer periphery of said windowpane.

6. A windowpane assembly as claimed in claim 1, wherein said base portion is made of an elastic material.

7. A windowpane assembly as claimed in claim 1, wherein said base portion extends straight in said compressed state.

8. A windowpane assembly as claimed in claim 1, wherein each of said latch arms has an innermost end having a latch claw which is engageable with the central portion of said base portion.

9. A windowpane assembly as claimed in claim 8, wherein the central portion of said base portion has a pair of latch claws, each being engageable with the corresponding latch claws of said latch arms.

10. A windowpane assembly as claimed in claim 1, wherein said disengaging means comprises at least two disengaging members which are engageable with stationary members connected to the vehicle body.

11. A windowpane assembly as claimed in claim 10, wherein said disengaging members are formed on tips of the arm portions of said corresponding latch arms.

12. A windowpane assembly as claimed in claim 11, wherein said disengaging members are arranged to be engageable with the front surface of said windowpane.

13. A windowpane assembly as claimed in claim 1, wherein said molding clip is formed in one piece.

14. A windowpane assembly as claimed in claim 13, wherein said molding clip is made of a synthetic resin.

15. A windowpane assembly as claimed in claim 14, wherein said molding clip has a portion in which a metallic plate is embedded.

16. A windowpane assembly as claimed in claim 13, wherein said molding clip is made of a metallic material.

* * * * *